(12) United States Patent
Sansa Perna et al.

(10) Patent No.: US 12,411,070 B2
(45) Date of Patent: Sep. 9, 2025

(54) OPTOMECHANICAL SENSOR FOR SENSING SPECIES' CONCENTRATION IN A LIQUID MEDIUM

(71) Applicant: COMMISSARIAT À L'ÉNERGIE ATOMIQUE ET AUX ÉNERGIES ALTERNATIVES, Paris (FR)

(72) Inventors: Marc Sansa Perna, Grenoble (FR); Thomas Alava, Grenoble (FR); Sebastien Hentz, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 848 days.

(21) Appl. No.: 17/655,084

(22) Filed: Mar. 16, 2022

(65) Prior Publication Data
US 2022/0299416 A1    Sep. 22, 2022

(30) Foreign Application Priority Data
Mar. 18, 2021   (FR) ..................................... 2102697

(51) Int. Cl.
*G01N 15/06*    (2024.01)
*B01L 3/00*     (2006.01)
(Continued)

(52) U.S. Cl.
CPC .... *G01N 15/0637* (2013.01); *B01L 3/502715* (2013.01); *G02B 6/4215* (2013.01);
(Continued)

(58) Field of Classification Search
CPC .. G01N 15/0637; G01N 15/01; G01N 15/075; G01N 21/7746; B01L 3/502715;
(Continued)

(56) References Cited

U.S. PATENT DOCUMENTS

| | | | |
|---|---|---|---|
| 10,564,092 B2 | 2/2020 | Virot et al. | |
| 2003/0206693 A1 * | 11/2003 | Tapalian | G01P 15/093 385/28 |

(Continued)

FOREIGN PATENT DOCUMENTS

EP    3462145 A1    4/2019

OTHER PUBLICATIONS

Search Report for French application No. FR 2102697 dated Oct. 25, 2021.
(Continued)

*Primary Examiner* — Brian J. Sines
(74) *Attorney, Agent, or Firm* — McDonald Hopkins LLC (57) ABSTRACT

A sensor for sensing the concentration of at least one biological species in blood includes a support, at least one waveguide, and an optomechanical resonator hanging to the support. The optomechanical resonator is optically coupled to the waveguide. The optomechanical resonator is configured to vibrate in a volume mode and includes at least one face extending in the plane of the sensor and is configured to receive molecules of the given species. The optical resonator includes a body comprising an optical active area and an optical insulation layer deposited at least in line with the optical active area so as to confine at least partially an electromagnetic wave in the body.

20 Claims, 7 Drawing Sheets

(51) Int. Cl.
*G01N 15/01* (2024.01)
*G01N 15/075* (2024.01)
*G02B 6/293* (2006.01)
*G02B 6/42* (2006.01)

(52) U.S. Cl.
CPC ............. *B01L 2300/0654* (2013.01); *B01L 2400/0433* (2013.01); *G01N 15/01* (2024.01); *G01N 15/075* (2024.01); *G02B 6/29338* (2013.01)

(58) Field of Classification Search
CPC ..... B01L 2300/0654; B01L 2400/0433; G02B 6/4215; G02B 6/29338
See application file for complete search history.

(56) References Cited

U.S. PATENT DOCUMENTS

| | | | | |
|---|---|---|---|---|
| 2005/0074209 | A1* | 4/2005 | Baumann | G02B 6/12007 385/50 |
| 2007/0147732 | A1* | 6/2007 | Sanders | G02B 6/107 385/32 |
| 2007/0230870 | A1* | 10/2007 | Smith | G02B 6/12007 385/32 |
| 2015/0107357 | A1* | 4/2015 | Hentz | G01D 5/268 73/382 G |

OTHER PUBLICATIONS

Fong, King Yan et al. "Nano-optomechanical resonators in microfluidics", Arxiv.org, Cornell University Library, Mar. 25, 2015, pp. 1-10.
Hermouet, M. et al. "1 million-Q optomechanical microdisk resonators for sensing with very large scale Integration", Progress in Biomedical Optics and Imaging, SPIE—International Society for Optical Engineering, Feb. 19, 2018, vol. 10491, pp. 104910C-104910C.
Yong, He: "Sensitivity of optical mass sensor enhanced by optomechanical coupling", Applied Physics Letters, Mar. 23, 2015, vol. 106, No. 12, pp. 121905-1-121905-5.
Kouh, Taejoon et al. "Nanomechanical Motion Transducers for Miniaturized Mechanical Systems", Micromachines, Apr. 4, 2017, vol. 8, No. 4, p. 108.
Demes, Thomas et al. "DNA grafting on silicon nanonets using eco-friendly functionalization process based on epoxy silane." Materials Today: Proceedings 6, 2019, pp. 333-339.
Gil-Santos, Eduardo et al., "Optomechanical detection of vibration modes of a single bacterium", Nature Nanotechnology, Jun. 2020, vol. 15, pp. 469-474.
Zhang, Miquin et al. "Proteins and cells on PEG immobilized silicon surfaces" Biomaterials Jan. 10, 1998, vol. 19, pp. 953-960.
Wang, Zhan-Hui et al. "Silicon surface modification with a mixed silanes layer to immobilize proteins for biosensor with imaging ellipsometry" Colloids and Surfaces B: Biointerfaces, 2004, vol. 34, pp. 173-177.
Li, Yan et al. "Rapid grafting of Azido-Labeled Oligo(ethylene glycol)s onto an Alkynyl-Terminated Monolayer on Nonoxidized Silicon via Microwave-Assisted "Click" Reaction", NIH Public Access Author Manuscript, Langmuir, Mar. 15, 2011, vol. 27, No. 6, pp. 2437-2445.

* cited by examiner

OPTOMECHANICAL SENSOR FOR SENSING SPECIES' CONCENTRATION IN A LIQUID MEDIUM

CROSS-REFERENCE TO RELATED APPLICATIONS

This application claims priority from French Patent Application No. 2102697 filed on Mar. 18, 2021. The content of this application is incorporated herein by reference in its entirety.

TECHNICAL FIELD AND PRIOR ART

The present invention relates to an optomechanical sensor for sensing species' concentration in a liquid medium, in particular biological species.

There are different techniques for detecting and quantifying biological species in a liquid. For example, the immuno-enzymatic ELISA method ("Enzyme-linked immunosorbent assay"), i.e. the immuno-enzymatic assay on a solid support, is a laboratory test that allows detecting the presence of an antibody or an antigen in a sample.

This method implements an immunoassay, in which the assay is coupled to an enzyme-catalysed reaction that releases a coloured component followed by spectroscopy. This method is long and intended for a single use.

There is also a method based on surface plasmon resonators. The attachment of a molecule to the surface is monitored by surface plasmon resonance, which detects changes in the optical index at the surface, and allows deducing the concentration of molecules therefrom. This method is easy to use and quick, but it is not very sensitive.

There are also devices implementing an optomechanical resonator, as described in the document (1) including an optomechanical disk on which a bacterium is deposited. An effect of the bacterium is to modify the mechanical resonance frequency of the disk, which modifies the optical path in the disk, thereby modifying the light intensity. From this intensity variation, it is possible to determine the mass deposited on the disk.

In general, the optical mode is localised on a portion of the disk, which could be defined as the optical active area. In general, this area is localised on the periphery of the disk.

Yet, the optical mode is not completely confined in the disk. This results in that, when a mass to be detected is deposited over the optical active area, it induces a mechanical response but it also disturbs the optical mode, thereby producing a wavelength offset of the mode and losses that degrade its quality. It is then necessary to implement a closed loop to monitor the wavelength of the optical mode, which is modified as the mass is deposited over the disk in order to take into account this variation in the determination of the deposited mass. Furthermore, the quality of the optical mode is degraded with the added mass, thereby limiting the service life of the sensor.

These drawbacks are all the more troublesome as the sensitive area on which the mass to be detected is deposited and the optical active area correspond at least partially to the same area of the surface of the sensor.

DISCLOSURE OF THE INVENTION

Consequently, the present invention aims to provide a sensor for sensing the concentration of species in a liquid medium that does not have the drawbacks of the prior art set out hereinabove.

The aim stated above is achieved by a sensor for sensing the concentration of at least one species contained in a liquid including at least one optical resonator and at least one mechanical resonator coupled to each other, at least one waveguide optically coupled to the optical resonator. The sensor includes an optical insulation layer formed at the surface of the optical resonator so as to at least cover the optical mode and insulate the optical mode from the surface of the optical resonator and thus make the optical mode barely sensitive, and even insensitive to the surface condition of the optical resonator. The optical mode is then sensitive only or almost only to the movement of the resonator.

Thus, when a mass is deposited over the optical resonator, the latter does not disturb the optical mode. Or, when the optical properties of the surface of the resonator are modified because of a treatment, for example the deposition of an adhesion layer, the optical mode is barely disturbed, or not at all.

Preferably, the material of the optical insulation layer is selected so as to have an optical index with regard to that of the material of the optical resonator such that the optical mode remains confined in the resonator.

Preferably, the material of the optical insulation layer has mechanical properties such that the function of the sensor is not or is barely degraded.

In the case of a disk-like shaped optical resonator, the optical mode is generally localised at the periphery of the disk, the optical insulation layer may have an annular shape covering the periphery of the disk.

In other words, the optical mode is insulated so as to make it insensitive or very little sensitive to the effects on the surface of the sensor.

Preferably, the mechanical resonator vibrates in a volume mode in the plane of the sensor and at a high frequency.

In a preferred embodiment, the optical resonator and the mechanical resonator are formed by the same object, forming an optomechanical resonator. Advantageously, the optomechanical resonator is at least partially functionalised so as to be selective with respect to said at least one species.

The object of the present application is then a sensor structure for sensing the concentration of at least one given species in a liquid medium including a support, at least one waveguide, at least one optical resonator hanging to the support, said optical resonator being optically coupled to the waveguide, so that the waveguide injects into the optical resonator an electromagnetic wave and collects said electromagnetic wave coming out of the waveguide, said optical resonator comprising an optical active area for the circulation of the electromagnetic wave, at least one mechanical resonator hanging to the support, said mechanical resonator and said optical resonator being coupled, said mechanical resonator being configured to vibrate in a volume mode and including at least one face extending in the plane of the sensor and configured to receive molecules of said given species. The optical resonator includes a body comprising the optical active area, said body comprising a first face and a second face, the second face being opposite the support and the first face being directed opposite to the support, said optical resonator also including an optical insulation layer deposited at least over the first face at least in line with the optical active area so as to confine at least partially the electromagnetic wave in the body.

Advantageously, the optical insulation layer is also deposited over the waveguide.

Preferably, the ratio between the optical refractive index of a material of the optical insulation layer and the optical refractive index of a material of the body is lower than or equal to 0.75.

Also preferably, the ratio between the Young's modulus of a material of the optical insulation layer and of the Young's modulus of a material of the body is lower than or equal to 10.

Advantageously, the optical insulation layer has a thickness smaller than or equal to the distance between the first face of the body and the second face of the body.

According to an additional feature, the optical insulation layer includes several materials having different optical indices.

For example, the optical resonator has a disk, ring or racetrack like shape and the optical active area is located in the external peripheral portion of the body and the optical insulation layer has a ring-like shape.

In an advantageous example, the mechanical resonator includes a functionalisation layer specific to said given species. Preferably, the functionalisation layer is present only over the optical insulation layer.

According to an additional feature, the optical resonator and the mechanical resonator are the same element hanging to the support, the first face forming the face configured to receive molecules, said element being an optomechanical resonator.

For example, the body is made of silicon and the optical insulation layer is selected amongst $SiO_2$, AlN or $Al_2O_3$.

Preferably, the dimension of the mechanical resonator and/or of the optical resonator in the direction normal to the plane of the sensor is at least 10 times smaller than the dimensions of the mechanical resonator and/or of the optical resonator in the plane of the sensor.

Advantageously, the functionalisation layer is homogeneous and/or has a thickness smaller than or equal to 20 nm.

According to an additional feature, the mechanical resonator is configured to vibrate in a radial mode.

In one embodiment, the mechanical resonator and/or the optical resonator hang(s) by a foot connecting a face of the resonator(s) opposite the support and the support.

The concentration sensor structure may include means for exciting the mechanical resonator so as to make it vibrate, preferably at its resonance frequency.

According to an additional feature, the concentration sensor structure includes several sets of coupled optical and mechanical resonators or several optomechanical resonators, coupled to a unique waveguide.

Another object of the present application is a sensor for sensing the concentration of at least one given species in a liquid medium including at least one sensor structure according to the invention, a light source connected to one end of the waveguide, and means for processing the light wave connected to the other end of the waveguide.

Another object of the present application is a microfluidic system including at least one channel for the circulation of a liquid whose concentration in at least one species is to be measured and at least one concentration sensor according to the invention, the optical resonator and the mechanical resonator being disposed in the channel.

BRIEF DESCRIPTION OF THE DRAWINGS

The present invention will be better understood based on the following description and the appended drawings wherein.

DETAILED DISCLOSURE OF PARTICULAR EMBODIMENTS

An optical mode is generally defined as a particular solution for the propagation of an electromagnetic wave in a cavity defined, for example, in an optical resonator. In the present application, the term "optical mode" refers to the area of the resonator in which the propagation path of this wave is located.

Figure 1A:
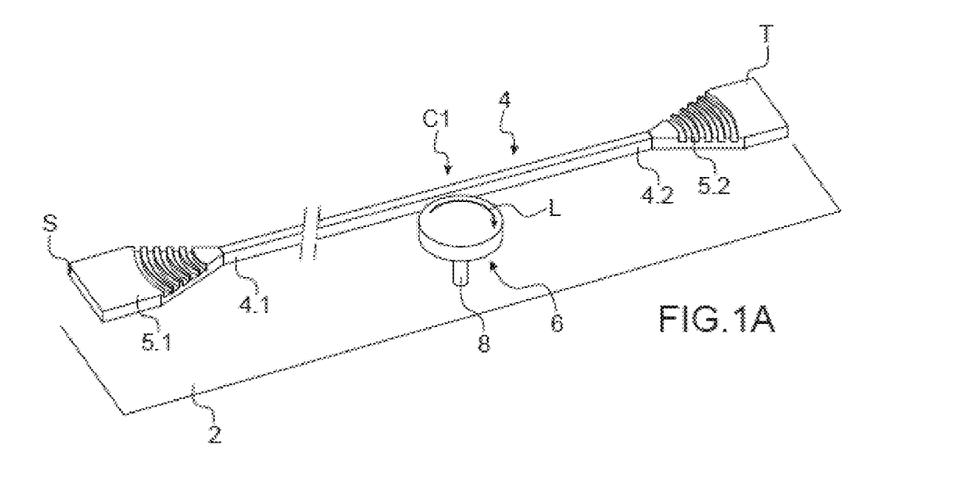
FIG. 1A is a perspective view of an example of a concentration sensor according to the invention.

In FIG. 1A, one could see an example of a sensor C1 for sensing the concentration of species in a liquid medium according to the invention.

In the present application, by "species", it should be understood biological species, such as bacteria or viruses, chemical molecules, atoms and/or nanoparticles.

The species to be detected have dimensions comprised between a few tens of nm to a few µm. The species have maximum dimensions smaller than or equal to the dimensions of the resonator in the plane, which will be described hereinbelow.

The liquid may be blood, plasma, humours, and more generally any body liquid, water of watercourses, such as rivers, streams, water of oceans, water of urban water supply networks . . . and any other liquid that one wishes to analyse.

The sensor C1 includes a support or substrate 2, at least one waveguide 4 supported by the substrate and an optomechanical resonator 6 hanging to the substrate 2, a light source S and means T for processing the light wave coming out of the waveguide. The support 2, the waveguide 4, the optomechanical resonator 6 forms a sensor structure. The light wave is designated by L.

The waveguide includes an inlet end 4.1 of a light wave connected to a light source through a coupling network 5.1, and an outlet end 4.2 connected to means for processing the light wave coming out of the waveguide through a coupling network 5.2.

The resonator 6 is disposed proximate to a sidewall of the waveguide 4 so as to be optically coupled thereto. The waveguide is in the evanescent field of the resonator, so that the light wave coming from the source is injected into the optical resonator and the light wave having circulated in the resonator is collected by the waveguide.

For example, the width of the space between the sidewall of the waveguide and the lateral edge of the resonator is comprised between 10 nm and 200 nm.

Figure 1B:
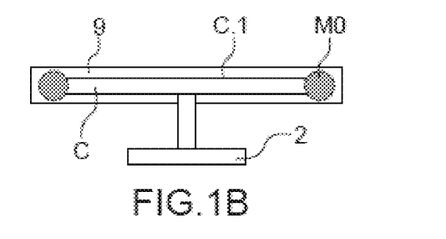
FIG. 1B is an enlarged view of the optomechanical resonator of FIG. 1A.

In the represented example, the optomechanical resonator 6 is in the form of a disk hanging to a foot 8 fastened to a face of the disk opposite the substrate. The disk extends in a plane of the sensor. The resonator includes two end faces substantially parallel to the plane of the sensor and a lateral face (FIG. 1B).

In the present application, by "plane of the sensor", it should be understood a plane parallel to the substrate.

Preferably, the foot has a small diameter in comparison with the dimensions of the disk in the plane of the sensor, more particularly a small diameter in comparison with the diameter of the disk, preferably the foot has a diameter 10 times smaller than the diameter of the disk.

More generally, the diameter of the foot is ten times smaller than the smaller dimension of the resonator in the plane of the sensor, thus the foot barely hinders, or not at all, the radial vibration of the resonator.

Alternatively, the resonator hangs by springs in the plane or by nanometric-sized beams extending radially and compressed and tensioned by the vibration of the disk. The springs or the beams are then sized so as to have a lower axial stiffness than that of the resonator.

Any other resonator shape could be suitable, for example, when viewed from above, the resonator may have a ring, ellipse or racetrack like shape. Alternatively, the resonator is a photonic crystal.

As represented in FIG. 1B, the resonator includes a body C, comprising an optical mode MO and an optical insulation layer 9 covering the body. The optical mode MO is schematised by dotted lines. In this example, the optical mode MO is located in the external periphery of the body C.

The optical insulation layer 9 is such that it ensures an insulation of the optical mode from the outside in order to limit the disturbances of the optical mode by the effects on the external surface of the resonator.

The material of the optical insulation layer is selected such that it offers a good optical refractive index contrast with the material of the body C, so that the optical mode remains confined in the body.

By "good optical refractive index contrast", it should be understood a difference between the optical refractive index of the body C and that of the optical insulation layer 9, such that a total reflection of the electromagnetic wave towards the body is obtained. The difference in the optical indices depends on the optical mode of interest, but the optical index of the layer 9 is preferably lower than 0.75 times that of the body C. Total reflection refers to a 100% reflection of the reflected wave.

For example, the body C is made of silicon with an optical index of 3.4 and the optical insulation layer 9 is made of $SiO_2$ with an optical refractive index equal to 2.3 for a waveguide of 1.55 µm.

Alternatively, the optical insulation layer 9 is made of AlN with a refractive index of 2 or of $Al_2O_3$, with a refractive index of 1.7 for a wavelength of 1.55 µm.

Alternatively, the body C is made of GaAs with a refractive index of 3.4 or of Ge with a refractive index of 4.25 for a wavelength of 1.55 µm.

The body C combined with the optical insulation layer 9 forms a waveguide for the electromagnetic wave.

In a particularly advantageous example, the optical insulation layer 9 is also deposited over all or part of the waveguide, which allows reducing the degradation of the performance of the waveguide resulting from a deposition of particles over the latter.

Preferably, the material of the optical insulation layer 9 has mechanical properties close or equal to that of the material of the body in order not to degrade the mechanical response of the resonator. Preferably, the material of the optical insulation layer has a Young's modulus of the same magnitude as that of the material of the body; the ratio between the Young's modulus of the insulation layer 9 and the Young's modulus of the material of the body is lower than or equal to 10.

Indeed, the resonator vibrates in the plane preferably in a radial mode, it is therefore preferable that the optical insulation layer 9 does not modify or barely modifies the mechanical resonance mode of the resonator.

For example, the body C is made of Si with a Young's modulus of 160 GPa and the insulation layer of $SiO_2$, AlN or $Al_2O_3$ with a Young's modulus of 65 Gpa, 277 GPa and 350 GPa respectively.

In the case where the optical resonator and the mechanical resonator are distinct from each other as it will be described hereinbelow, the mechanical properties of the material of the optical insulation layer have no influence on the detection.

The thickness of the optical insulation layer 9 depends on that of the body. Preferably, the optical insulation layer 9 has a thickness smaller than or equal to that of the body C, and preferably equal to the thickness of the body ensuring an insulation of the optical mode. A thickness close or equal to that of the body allows ensuring a good optical mode confinement while limiting the mechanical effect of the insulation layer on the resonator.

As an example, the body C has a diameter comprised between 200 nm and 200 µm, a thickness comprised between $\frac{1}{100}$ and $\frac{1}{10}$ of its diameter and the optical insulation layer has a thickness comprised between 2 nm and 500 nm.

Alternatively, the optical insulation layer includes several different materials with specific optical properties. In one embodiment, the refractive index of the layer in contact with the body is the lowest one and the refractive indices increase when getting away from the body, in the same fashion as graded-index optical fibres. This allows combining several layers with different mechanical properties. For example, this allows depositing at first a $SiO_2$ layer (n=2.3, density 2.2 $kg/m^2$), which is relatively barely dense, followed by a second thin $Al_2O_3$ layer (n=1.7, density 4 $kg/m^2$) much denser yet more optically insulating, to effectively confine the optical mode with the lesser impact for the mechanical mode.

The resonator is intended to collect the species to be detected, the surface of the resonator is therefore preferably as large as possible to maximise the amount of capturable species.

However, one preferably seeks to minimise the lateral surface of the resonator to limit the viscous losses by interaction with the solvent and promote shearing. Hence, one seeks to maximise the end surfaces of the resonator and to reduce the lateral surface. One also seeks to reduce the mass of the optomechanical resonator to have a good mass sensitivity.

Hence, the disk-like shape is particularly advantageous in terms of surface ratio. Preferably, a resonator having a considerable aspect ratio, a considerable dimension in the plane of the sensor/thickness of the resonator ratio is selected.

In the case of a disk, the Diameter of the disk/thickness ratio is preferably comprised between 10 and 100. The maximum diameter of the resonator is preferably a few hundred µm.

In one embodiment, the resonator includes slender edges advantageously improving the optical performances of the resonator.

Preferably, the resonator is further such that it vibrates in a volume mode in the plane, allowing reaching a high vibration frequency for example at least equal to 100 MHz.

Preferably, the resonator vibrates in a radial mode or RBM (Radial Breathing Mode), such a mode allows reaching a very good coupling between the optical mode and the mechanical mode. Indeed, the radial vibration of the disk has a considerable impact on the optical properties of the disk, in particular on the length of the optical path within the resonator and therefore on the light power recovered by the waveguide 2.

Alternatively, the resonator could vibrate in a tangential mode or a wine glass mode. Nevertheless, it has a reduced efficiency in comparison with the resonator in a radial mode.

Figure 2:
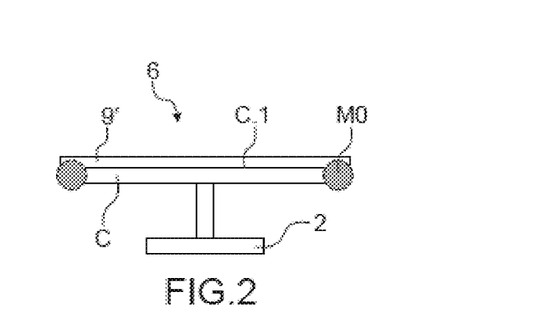
FIG. 2 is a side view of another example of an optomechanical resonator.

In FIG. 2, one could see another embodiment of the optomechanical resonator wherein the optical insulation layer 9' is formed only over the upper face C.1 of the body in the representation of FIG. 2, i.e. the face that is not opposite the support.

Figure 3A:
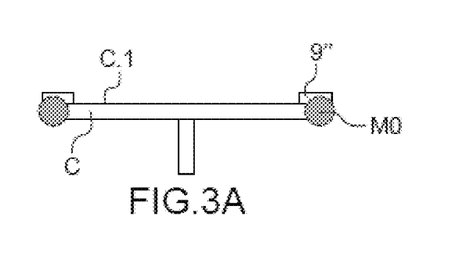
FIG. 3A is a side view of another example of an optomechanical resonator.
Figure 3B:
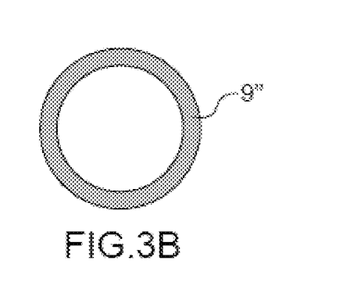
FIG. 3B is a top view of the resonator of FIG. 3A.

In FIGS. 3A and 3B, one could see another embodiment of the optomechanical resonator, wherein the optical insulation layer 9" is formed only over the peripheral area of the body C above the optical mode MO. The implementation of an optical insulation layer with a reduced surface allows limiting the influence of the optical insulation layer on the mechanical properties of the mechanical resonator. Furthermore, the external peripheral area is the area that undergoes the largest displacement in the radial vibration mode. Alternatively, the optical insulation layer also covers the lateral edge of the body and the external peripheral area of the lower face of the body.

Figure 4:
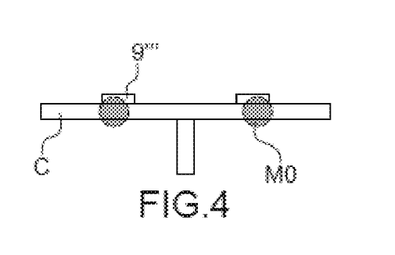
FIG. 4 is a side view of a variant of the optomechanical resonator of FIG. 3A.

In another embodiment represented in FIG. 4, the optical mode MO is not located at the external periphery of the body but thereinside over a diameter smaller than the external diameter of the body and the optical insulation layer 9''' is located opposite the optical mode MO.

In the described examples, the optical insulation layer has a constant thickness while considering the manufacturing process. Alternatively, the layer has different thicknesses according to the covered area. Preferably, it has a larger thickness opposite the optical mode and a smaller thickness opposite the other areas of the body, which advantageously allows limiting the influence of the optical insulation layer on the mechanical properties of the resonator.

In the above-described examples, the sensor does not include any functionalisation layer, the sensor is therefore not selective with respect to the detected species.

Figure 5:
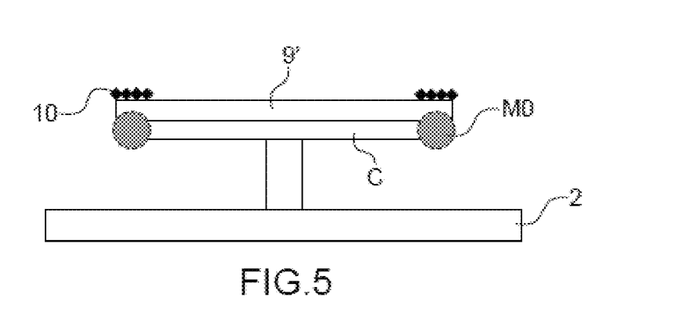
FIG. 5 is a side view of an example of an optomechanical resonator including a functionalisation layer.
Figure 6:
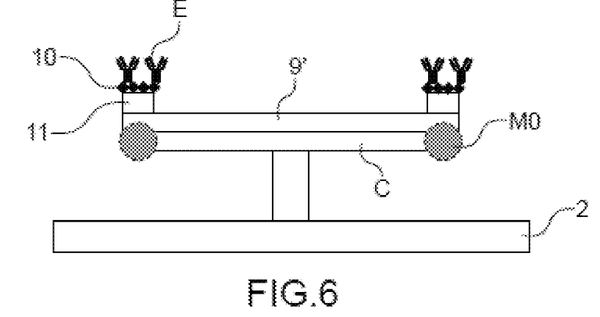
FIG. 6 is a side view of an optomechanical resonator including an adhesion layer and a functionalisation layer.

In FIGS. 5 and 6, one could see that according to the invention the sensor is functionalised so as to be specific to one or several species to be detected.

The functionalisation layer may be sensitive to biological species, to individual atoms or to nanoparticles. In the case of nanoparticles, the specificity may be directed against markers present at the surface of these nanoparticles or against the atomic element making up the nanoparticle. One could also consider a specificity to the size of the nanoparticles.

In FIG. 5, the functionalisation layer 10 is formed directly over the optical insulation layer 9'.

In FIG. 6, an adhesion layer 11 is deposited over the optical insulation layer 9' and the functionalisation layer 10 is deposited over the adhesion layer. In this example, the adhesion layer 11 and the functionalisation layer 10 entirely cover the optical insulation layer 9'. The molecules E of the species to be detected trapped by the functionalisation layer 10 are schematised.

Alternatively, the adhesion layer and the functionalisation layer or the functionalisation layer cover only a portion of the optical insulation layer.

The implementation of an optical insulation layer is even more advantageous in the case of a functionalised sensor as the adhesion layer is generally made prior to the functionalisation or grafting layer, and as the latter has the effect of reducing the quality of the surface of the body. Making a disk with specific optical properties at the optical active area is then made difficult. The optical insulation layer limits, and even prevents, such a degradation of the surface of the body.

For example, the functionalisation layer includes at least one macromolecule capable of specifically recognising a target, i.e. the given species to be detected.

For example, the functionalisation of the resonator to several species is obtained by functionalising different portions of the resonator, each one specific to a species, or by making a functionalisation layer that mixes different bioreceptors each one specific to a species.

As an example, the functionalisation layer includes antibodies specific to a protein or to a small molecule, for example a toxin, aptamers specifically recognising a protein or a small molecule, DNA or RNA strands which will hybridise with a DNA or RNA strand complementary to the one grafted on the surface of the resonator, molecular imprinting polymers (MIP).

The functionalisation of the surface of the resonator consists in modifying the molecules present at the surface of the sensor and/or in grafting on the surface of the sensor the new molecules enabling the specific recognition of the sought target.

For example, the modification of the molecules present at the surface of the sensor may consist, without limitation, in the oxidation of a function, the dehydration of an alcohol function, the nucleophilic substitution of a group with another or an esterification. All these transformations are well known to a person skilled in the art who will know how to switch from a chemical function into the interesting one.

In general, a functionalisation by grafting may require an intermediate layer supporting the layer with new molecules conferring the desired functionalisation. There are several methods for functionalising a silicon surface. A first method consists in grafting a PEG (poly(ethylene glycol) polymer chain) layer on the silicon surface. One end of the chain of the PEG is covalently bound to the silicon surface and the other end remains free thereby allowing grafting the molecule of interest for a specific recognition of the sensor. This method is described in the document (2). Another method consists in using carbon chains one of the ends of which has a silane function and the other end is selected so as to subsequently graft the molecule enabling the specific recognition of the sensor. The other end may be an epoxy function, allowing subsequently grafting DNA, or a N-hydroxysuccinimide ester function which will enable grafting of a protein, for example immunoglobulin, via an amine radical within the structure of the latter. This method is described in the documents (3) and (4). Finally, another method consists in grafting on the silicon surface an alkynene having an alcene function at one end and an alcyne function protected by a trimethylgermanyl at the other end. After grafting on the silicon surface, the alcyne function is used to couple the molecule of interest by click chemistry. This method is illustrated in the document (5).

The functionalisation layer 10 has a small thickness, and possibly includes a single layer of functionalisation molecules. Advantageously, the thickness of the functionalisation layer is smaller than 20 nm, and preferably smaller than 10 nm. Furthermore, the layer has a constant thickness over the entire surface.

In the present application, by "constant thickness", it should be understood a layer whose thickness varies at most by 25% of its thickness over the entire surface thereof.

Furthermore, the functionalisation layer is quite advantageously homogeneous at the surface of the resonator, i.e. it includes a relatively uniform number of molecules per unit area.

The homogeneity of the layer corresponds to the amount of recognition sites of the target to be detected per unit area, which is a multiple of the number of immobilised bioreceptor molecules per unit area at the surface of the resonator. A unit area is defined as being at least $1/100^{th}$ of the surface of the sensor. A layer is said homogeneous, when the number of grafting/recognition sites available in each unit area varies by less than $5/100^{th}$ around an average value. The number of recognition sites per unit area depends on the selected functionalisation protocol and on the size of the bioreceptor molecule.

The implementation of a thin and advantageously homogeneous functionalisation layer allows preserving the optical coupling and optomechanical coupling properties of the resonator after functionalisation.

Furthermore, the implementation of a homogeneous layer allows finding the concentration of the species more easily.

The functionalisation layer may be localised, advantageously it may be deposited only over the end faces of the resonator, and possibly over only one of the end faces, and not over the lateral face of the resonator. In this case, the functionalisation layer then does not intervene in the optical coupling between the waveguide and the resonator.

Even more advantageously, the sensor includes a passivation layer blocking the absorption of the particles of interest, this layer is formed over the areas of the sensor where it is not desired that the target particles be fixed, i.e. over the areas other than those where the functionalisation layer is formed. For example, the passivation layer is formed at least over the substrate.

In the case where the functionalisation layer covers a portion of the upper end face of the resonator, preferably its peripheral area, it has then a ring-like shape for example, the passivation layer also covers the central portion of the upper end face of the resonator inside the functionalisation layer.

Thanks to the implementation of a passivation layer, the adhesion of the sought targets outside the sensitive area of the sensor is limited. The effective detection of lower concentrations of species within the liquid medium is then improved.

In the case where the functionalisation layer covers the entire sensitive surface of the sensor, the passivation layer is formed only over the substrate.

For example, the passivation layer contains silanes of formula $X_3Si$—$(CH_2)nCH_3$. The portion $X_3Si$— enables adhesion on silicon and the saturated aliphatic chain —$(CH_2)nCH_3$ prevents grafting of the molecules of interest.

For example, X may be a halogen (Cl, Br . . . ) or a $R_3O$— ($R=CH_3$—, $CH_3CH_2$— . . . ) group.

In another example, the passivation layer is a PLL-g-PEG (poly(L-lysine)-graft-poly(ethylene glycol) polymer. The lysine portion enables grafting on the substrate whereas the ethylene glycol chain prevents the molecules from being grafted on the substrate.

The operation of the sensor including a functionalisation layer will now be described.

The wavelength of the light wave to be injected into the resonator is selected close to the optical resonance of the resonator, i.e. on the edge of the optical resonance peak. The light wave resonating inside the optical resonator is then very sensitive to the mechanical deformation of the mechanical resonator, in particular when the optical and mechanical resonators are coincident.

The light wave at the selected wavelength is injected into the waveguide by a light source, the light wave is injected into the optomechanical resonator 6 by optical coupling. L refers to the light wave circulating in the resonator. The modulation frequency of the power of the light wave is selected so as to make the resonator vibrate in a volume mode, advantageously in a radial mode.

The sensor is immersed in a liquid whose concentration in a given species is to be measured and for which the sensor has a suitable functionalisation layer. The molecules of the given species are then captured by the functionalisation layer and are fixed on the resonator, which modifies the mass of the resonator and therefore the vibration frequency of the resonator. The measurement of the variation of the vibration frequency allows determining the amount of a given species deposited over the resonator and determining the concentration. The presence of the optical insulation layer prevents the optical mode from being directly modified by the deposited mass, it is modified primarily or only by the movement of the resonator.

Preferably, before the circulation of the sample containing the target to be detected, a biological buffer solution having a viscosity similar to that of the sample containing the target circulates around the sensor which enables the sensor to reach a stable resonance frequency. Afterwards, the sample containing the target is injected and the sensor perceives the change in the resonance frequency caused by grafting of the target on the resonator. This response of the sensor to the biological grafting has $N*e^{-x/t}$ ($k=Ae^{(Ea/RT)}$) dynamics and lasts about 5 min to 40 min in practice.

In an advantageous example, several sensors are used.

In a configuration with two sensors, the first sensor is functionalised with a first biological molecule specifically recognising the target. The second sensor is functionalised with a second biological molecule of a similar nature as the first molecule, but having a recognition capability specific to another species than the sought target.

The signal emitted by the first sensor contains the information on the specific adhesion of the target and the information on the non-specific adhesion, of other elements than the one sought, which is a parasitic information. The signal emitted by the second sensor contains the information on the non-specific adhesion. By subtracting the signal of the second sensor from the signal of the first sensor, the information on the specific grafting is obtained, which allows detecting the presence of the sought target.

After a measurement is carried out by the sensor, one could perform a cleaning of the latter.

According to a rinsing example, a biological buffer solution is sent on the sensor via the fluid feed-in system. This solution causes a detachment of part of the targets immobilised on the sensor. Some targets could remain at the surface of the sensor, immobilised on their corresponding bioreceptors. These remaining elements cause a decrease in the amount of sites available for subsequent analyses with the same sensors.

Nevertheless, the sensor according to the invention has a great sensitivity and is therefore particularly suited to detect only a very small number of target molecules. The detection may often be made with the recognition of a number of target elements representing only a portion of all graftable targets at the surface of the sensor. Thus, in particular in the application for detecting a small number of target molecules, the sensors could carry out several successive analyses, because the analysed samples do not contain enough target elements to saturate the surface of the sensor.

In the case where it is desired to force the separation of the remaining target elements in order to clear all bioreceptors. Several techniques may be used which should be adapted according to the target molecules.

In the case of hybridised DNA strands (target and bioreceptor), it is possible to increase the temperature of the sensor to 80° C. for a duration of a few minutes, for example by means of an affixed heating device, which causes the dehybridisation of any DNA-DNA complex and leashes the targeted elements off the surface of the disk. A biological buffer type rinsing solution could simultaneously circulate to collect the leashed elements.

For proteins-proteins or proteins-other biological element to be detected, such as toxins, bacteria or cells, recognitions, solutions with a low concentration of soda NaOH or guanidine hydrochloride could be used which could cause the dissociation of the antigen-antibody bond and completely regenerate the sensor before new measurements. Nevertheless, the regeneration could degrade the receptor proteins, thereby limiting the number of possible regenerations, for example according to the functionalised surface, the number of regenerations may be comprised between 10 and 40.

In the above-described example of operation, the resonator is made to vibrate by the measuring light wave.

Alternatively, the resonator is not set to vibrate by the light wave. Only the resonance frequency variation is measured thanks to the Brownian noise of the resonator, indeed the thermal motion makes the resonator vibrate at its resonance frequency. In this variant, the light wave serves only to detect the vibration frequency vibration.

In the above-described other examples, the optomechanical resonator includes a body provided with an optical insulation layer at least over its upper surface C.1 at least opposite the optical mode.

Figure 7:
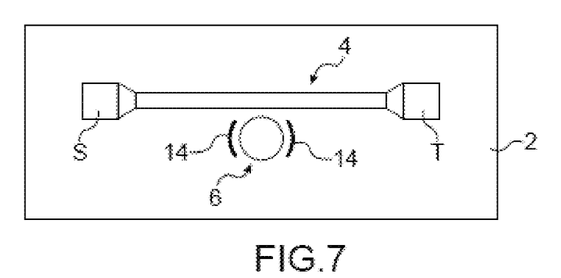
FIG. 7 is a schematically represented top view of an example of a concentration sensor including excitation means.

In an advantageous variant, the sensor represented in FIG. 7 further includes specific excitation means 14 to make the resonator vibrate, at its resonance frequency, which allows for a great sensitivity in reading the mechanical frequency changes, and preferably at a significant amplitude to maximise the signal-to-noise ratio. Setting the resonator to vibrate allows improving the resolution.

Grafting of the biological targets, increases the mass of the mechanical resonator, which modifies its resonance frequency, which is converted by the optical resonator forming a transducer.

Hence, optical means for setting the optical resonator in optical resonance and means for setting the mechanical resonator in mechanical resonance could coexist. The optical resonator forms a transducer, which then converts the mechanical resonance into light and then electrical information.

In another example, the excitation means 14 are electrostatic, they include a first electrode 14.1 formed on the lateral edge of the resonator 4 for example by doping silicon and a second electrode 14.2 formed on the support opposite the first electrode.

Alternatively, the excitation means are of the radiation-pressure optical type, for example using a so-called "pump-probe" mode using a light signal with a wavelength different from the light signal used in the measurement, and whose amplitude is frequency-modulated at the resonance frequency of the disk. Alternatively, a single light signal is used which ensures both the measurement and the excitation; the latter is modulated by means of an electro-optical modulator.

In an advantageous variant, a Phase Lock Loop is integrated which allows servo-controlling the vibration phase at resonance.

Advantageously, a resonator with a reduced mass is made in order to increase the sensitivity of the sensor.

Figure 8:
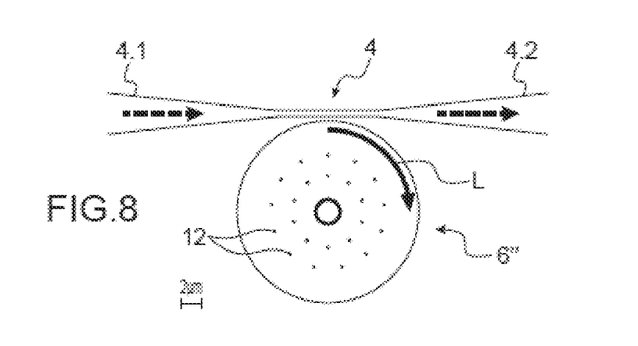
FIG. 8 is a schematically represented top view of a concentration sensor whose resonator includes holes allowing increasing its accuracy.

This could be obtained by forming through holes 12 in the resonator 6", as represented in FIG. 8. The holes 12 have the additional advantage of increasing the specific surface covered by the functionalisation layer. For example, the holes are in the direction normal to the plane of the resonator. Furthermore, these holes may advantageously be used to facilitate clearing of the resonator, when it is cleared by etching of the sacrificial layer in a microelectronics process.

In the case where the foot is made of the material of the sacrificial layer, for example of $SiO_2$, its diameter before clearing is selected so that at the end of etching, the "remaining" diameter is enough to support the resonator.

Figure 9:
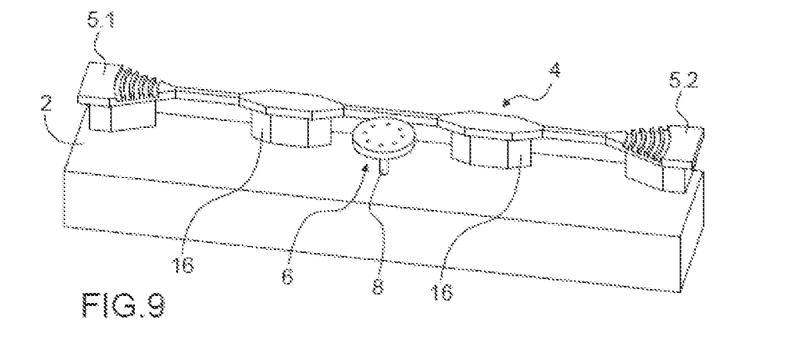
FIG. 9 is a perspective view of another example of a concentration sensor having a particular waveguide structure.

In FIG. 9, one could see an embodiment of an advantageous sensor in the case where the waveguide is supported by portions of the sacrificial layer.

When clearing the resonator, it is not desired to entirely clear the waveguide 2 or the coupling networks.

Moreover, the width of the waveguides is determined so as to obtain particular optical properties (for example, to be optically monomode). In the case where this width is small in comparison with the distances to be etched under the resonator, it is advantageously provided for waveguide portions 16 that are wider at a distance from the areas of coupling with the resonator and/or in proximity with the connections between the waveguide and the coupling networks 5.1, 5.2.

Thus, the sacrificial layer under the portions 16 is not entirely etched and serves as a support to the waveguide. The width of the portions 16 is selected so as to be at least equal to the maximum distance to be etched in the plane+a width enough to support the waveguide.

In the represented example, the portions 16 are evenly distributed along the waveguide but this is not restrictive.

Figure 10:
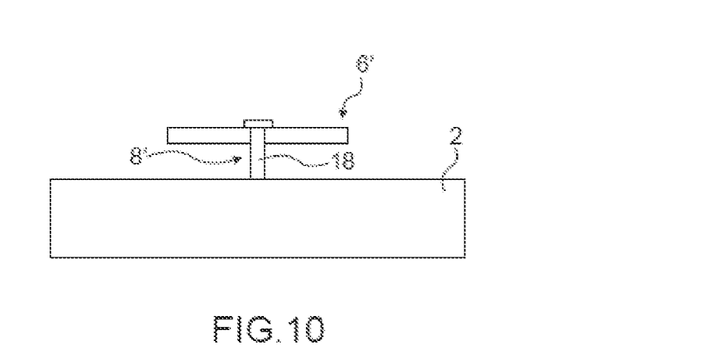
FIG. 10 is a side view of an embodiment of a resonator that could be implemented in the concentration sensor according to the invention.
Figure 11:
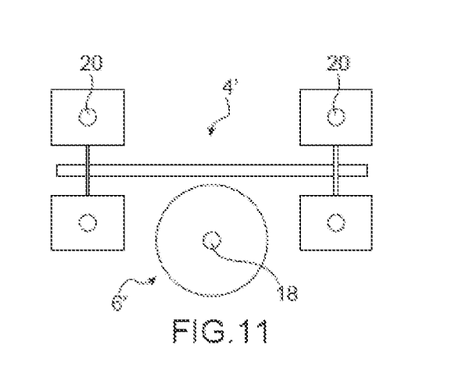
FIG. 11 is a top view of an example of a sensor implementing the resonator of FIG. 10.

In another advantageous embodiment represented in FIGS. 10 and 11 allowing getting rid of the etching problems, the foot 8' of the resonator 6' and/or the supports of the waveguide 4' are made by vias 18, 20 made of a material that is insensitive to etching during clearing. For example, in the case where clearing is obtained by silicon oxide etching with HF, the vias are made of polysilicon or of a metal.

The waveguide is coupled to the light source and to the analysis device for example by optical fibres positioned at an optimum angle thanks to piezoelectrical positioners above the coupling networks. Advantageously, it is possible to use a fibre drawing technique consisting in "gluing" fibres directly on the chip.

Figure 12:
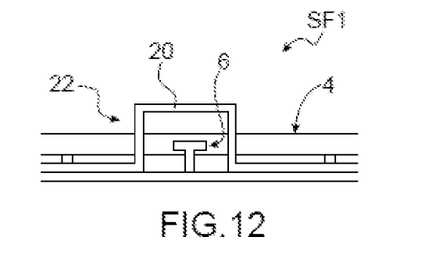
FIG. 12 is a schematic representation of an example of a microfluidic system implementing at least one concentration sensor according to the invention.

In FIG. 12, one could see an example of a microfluidic system integrating the sensor.

The system SF1 includes a microchannel 20 formed for example in a cover 22 which is affixed on the substrate. The liquid to be analysed is injected into the channel 20. The dimensions of the channel are such that the liquid is constrained to circulate only at the resonator. Thus, the likelihood of capturing the species to be detected is maximised and the analysis time is reduced. Furthermore, it is possible to reduce the required liquid volume. A typical microchannel may measure from 5 µm to 500 µm in height and from 10 µm to 700 µm in width.

In the represented example, the system includes a single sensor and the waveguide is transverse to the channel.

Alternatively, the system includes several sensors disposed one after another and functionalised differently and each coupled to its own waveguide. Thus, with a single system, it is possible to determine the concentrations of several species in the same liquid sample almost simultaneously.

Alternatively, the waveguide is aligned with at least one portion of the channel and several resonators are coupled thereto and by multiplexing it is possible to carry out the detection of several species, and possibly perform positive controls, for example using two sensors, a first sensor functionalised with a bioreceptor molecule and having a specificity to the sought molecule and a second sensor functionalised with a bioreceptor molecule of the same type as the first sensor, but having no specificity to the sought molecule.

Figure 13:
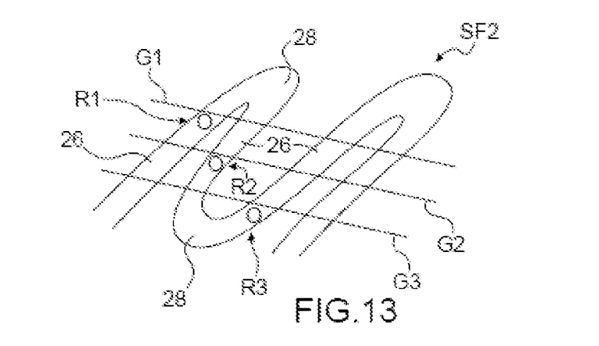
FIG. 13 is a schematic representation of another example of a microfluidic system implementing at least one concentration sensor according to the invention.

In FIG. 13, one could see another example of a microfluidic circuit SF2 including a channel 24 in the form of a serpentine comprising straight portions 26 connected by curved portions 28 and a resonator R1, R2, R3 located in a straight portion 26 and waveguides G1, G2, G3 coupled to each resonator, and transverse to the straight portions.

Alternatively, the resonators are coupled to the same waveguide and the detection is carried out by multiplexing.

Figure 14:
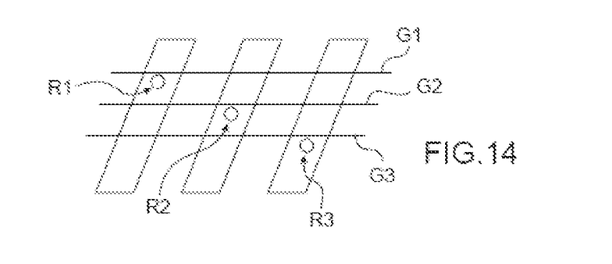
FIG. 14 is a schematic representation of another example of a microfluidic system implementing at least one concentration sensor according to the invention.

In FIG. 14, one could also see another example of a microfluidic system SF3 which differs from the system of FIG. 13 in that the straight portions 26 are not connected by curved portions and form independent microchannels that could be fed with different liquids.

Advantageously, the functionalisation may be carried out by making the functionalisation liquid circulate in the channel during manufacture.

In the case of the system SF2, it is advantageously possible to make only the straight portions beforehand which are functionalised with different liquids, thus each resonator has its own functionalisation and afterwards the curved portions are made so as to form a unique system with resonators having different functionalisations.

Figure 15:
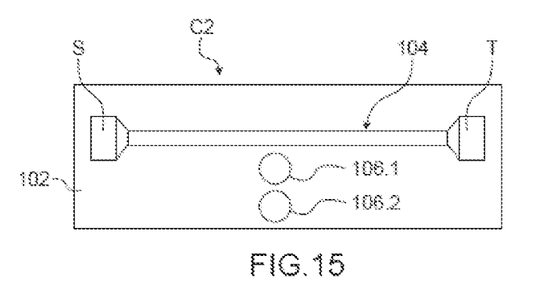
FIG. 15 is a schematic representation of an example of a sensor including one optical resonator and one optical resonator distinct from each other and coupled to each other.

In FIG. 15, one could see an example of a sensor wherein the optical resonator and the mechanical resonator are distinct from each other.

The sensor C2 includes a sensor structure comprising a substrate 102, a waveguide 104, an optical resonator 106.1 optically coupled to the waveguide 104 and a mechanical resonator 106.2 disposed in the evanescent field of the optical resonator 106.1 and capable of modifying the optical properties of the optical resonator thanks to its mass modification by particle capture. The sensor C2 also includes a light source S connected to one end of the waveguide 104 and processing means T connected to the other end of the waveguide 104.

The mechanical resonator 106.2 vibrates in a volume mode preferably in a radial mode.

In this example and preferably, only the optical resonator 106.1 includes an optical insulation layer, the latter not necessarily being over the mechanical resonator. Furthermore, the mechanical properties of the mechanical resonator are not modified. Nevertheless, such a layer may be made over the mechanical resonator to simplify the manufacturing process.

In this example, the mechanical resonator may have a discontinuous or irregular shape, for example a square shape since it is not intended to guide the light wave.

More generally, the diameter of the foot is ten times smaller than the smallest dimension of the mechanical resonator in the plane of the sensor, thus the foot barely hinders, or not at all, the radial vibration of the resonator.

Preferably, a mechanical resonator having a considerable aspect ratio, a considerable dimension in the plane of the sensor/thickness of the resonator ratio is selected.

The mechanical resonator may be excited by external electrical means or by thermal motion, in the latter case, the signal-to-noise ratio is poorer.

An example of a method for making the sensor C1 will now be described based on FIGS. 16A to 16F.

Figure 16A:
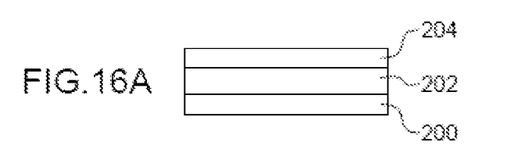
FIGS. 16A to 16F are schematic representations of elements obtained during steps of an example of a method for manufacturing a sensor according to the invention.

For example, a SOI (Silicon on Insulator) substrate is used including a polysilicon substrate 200, a $SiO_2$ layer 202, for example 2 µm thick, and a monocrystalline silicon layer 204 for example 0.22 µm thick, represented in FIG. 16A.

Figure 16B:
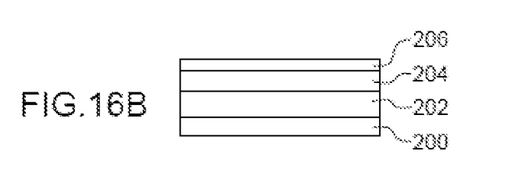

During a first step, an optical insulation layer 206 is formed over the layer 204, for example by deposition. For example, a $SiO_2$ layer may be deposited by chemical vapour deposition (CVD).

For example, the layer 206 is made of $SiO_2$ and has a thickness in the range of 100 nm. The element thus formed is represented in FIG. 16B.

Figure 16C:
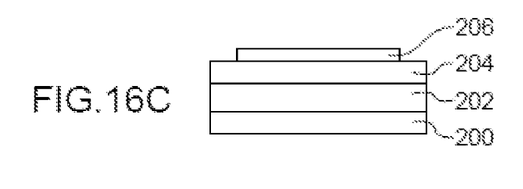

During a next step, the structure of the sensor, in particular the resonator and the waveguide, is defined by lithography, and then by etching. For example, the etching is a dry etching with stoppage at the layer 202.

The element thus obtained is represented in FIG. 16C.

Figure 16D:
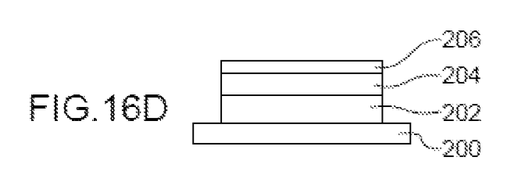

During a next step, an intermediate layer 208 enabling the functionalisation of the resonator is formed. For example, an Au layer with a thickness of about 10 nm is deposited by PVS. Afterwards, the layer 208 is defined so as to be only in line with the optical mode, for example by transfer or lift-off.

The element thus obtained is represented in FIG. 16D.

Figure 16E:
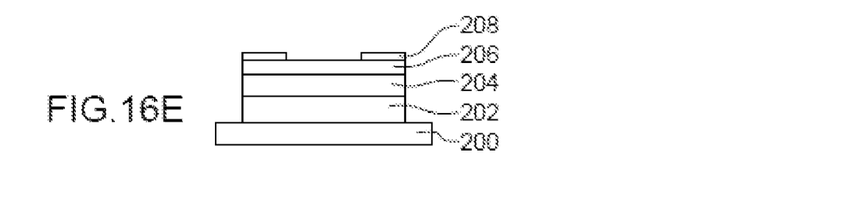

The element thus obtained is represented in FIG. 16E.

Afterwards, the resonator is cleared for example by isotropic wet etching, for example with HF, of the layer 202.

Figure 16F:
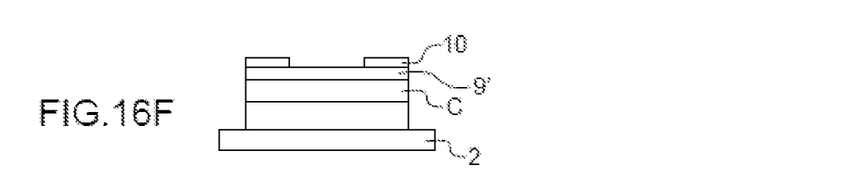

During a next step, the functionalisation layer is formed over the intermediate layer, for example a deposition of aptamers over the Au layer by immersion chemical techniques. The element thus obtained is represented in FIG. 16F. An optomechanical resonator including the body C, the optical insulation layer 9' and the functionalisation layer 10 is obtained.

In the case of a sensor with electrostatic actuation, a step is provided for during which a doping is carried out by localised implantation in order to make conductive tracks.

Afterwards, a succession of deposits of layers of different metals is formed to form the electrical contacts. For example, the stack of layers thus formed is Ti/TiN/Au. For example, the stack of layers is formed by deposition and then the contacts 206 are defined by lithography and then by etching.

In the case of the sensor of FIG. 10, additional steps for forming the metallic suspension rods are required, for example steps of making metal vias well known to a person skilled in the art are carried out.

Afterwards, a functionalisation of the sensor is carried out. It may consist of a functionalisation of the entire structure, the functionalisation layer being formed both on the resonator and on the waveguide, or still a localised functionalisation, i.e. for example only on the end faces of the resonator. The functionalisation layer may be made according to one of the above-described techniques.

In the case of manufacturing a microfluidic system, the method further includes the manufacture of a cover provided with at least one channel and tight assembly of the cover and of the sensor. Afterwards, the functionalisation could take place by circulation of a fluid ensuring the functionalisation of the resonator.

REFERENCES (1) E. Gil-Santos et al., "Optomechanical detection of vibration modes of a single bacterium", Nature Nanotechnology, 15 (469-474), 2020,
(2) Zhang, M., Desai, T. & Ferrari, M. Proteins and cells on PEG immobilized silicon surfaces. *Biomaterials* 19, 953-960 (1998).
(3) Demes, T. et al. DNA grafting on silicon nanonets using eco-friendly functionalization process based on epoxy silane. *Materials Today: Proceedings* 6, 333-339 (2019).
(4) Wang, Z.-H. & Jin, G. Silicon surface modification with a mixed silanes layer to immobilize proteins for biosensor with imaging ellipsometry. *Colloids and Surfaces B: Biointerfaces* 34, 173-177 (2004).
(5) Li, Y., Wang, J. & Cai, C. Rapid grafting of Azido-Labeled Oligo (ethylene glycol)s onto an Alkynyl-Terminated Monolayer on Nonoxidized Silicon via Microwave-Assisted "Click" Reaction, *Langmuir* 27, 2437-2445 (2011).

The invention claimed is:

1. A sensor structure for sensing the concentration of at least one given species in a liquid medium including:
   a support,
   at least one waveguide,
   at least one optical resonator hanging to the support, said optical resonator being optically coupled to the waveguide so that the waveguide injects into the optical resonator an electromagnetic wave and collects said electromagnetic wave coming out of the waveguide, said optical resonator comprising an optical active area for the circulation of the electromagnetic wave, and
   at least one mechanical sensor hanging to the support, said mechanical resonator and said optical resonator being coupled, said mechanical resonator being configured to vibrate in a volume mode and including at least one face extending in the plane of the sensor and configured to receive molecules of said given species,
   wherein the optical resonator includes a body comprising the optical active area, said body comprising a first face and a second face, the second face being opposite the support and the first face being directed opposite to the support, said optical resonator also including an optical insulation layer deposited at least over the first face at least in line with the optical active area so as to confine at least partially the electromagnetic wave in the body,
   the concentration sensor structure, intended to be immersed in a liquid medium, further comprising a functionalisation layer and covering the optical insulation layer, the functionalisation layer and the optical insulation layer being either directly in contact or separated by an adhesion layer.

2. The concentration sensor structure according to claim 1, wherein the optical insulation layer is also deposited over the waveguide.

3. The concentration sensor structure according to claim 1, wherein the ratio between the optical refractive index of a material of the optical insulation layer and the optical refractive index of a material of the body is lower than or equal to 0.75.

4. The concentration sensor structure according to claim 1, wherein the ratio between the Young's modulus of a material of the optical insulation layer and of the Young's modulus of a material of the body is lower than or equal to 10.

5. The concentration sensor structure according to claim 1, wherein the optical insulation layer has a thickness smaller than or equal to the distance between the first face of the body and the second face of the body.

6. The concentration sensor structure according to claim 1, wherein the optical insulation layer includes several materials having different optical indices.

7. The concentration sensor structure according to claim 1, wherein the optical resonator has a disk, ring or racetrack like shape and wherein the optical active area is located in the external peripheral portion of the body and the optical insulation layer has a ring-like shape.

8. The concentration sensor structure according to claim 1, wherein the optical resonator and the mechanical resonator are the same element hanging to the support, the first face forming the face configured to receive molecules, said element being an optomechanical resonator.

9. The concentration sensor structure according to claim 1, wherein the body is made of silicon and the optical insulation layer is selected amongst $SiO_2$, AlN or $Al_2O_3$.

10. The concentration sensor structure according to claim 1, wherein the dimension of the mechanical resonator and/or of the optical resonator in the direction normal to the plane of the sensor is at least 10 times smaller than the dimensions of the mechanical resonator and/or of the optical resonator in the plane of the sensor.

11. The concentration sensor structure according to claim 1, wherein the mechanical resonator includes a functionalisation layer specific to said given species.

12. The concentration sensor structure according to claim 11, wherein the functionalisation layer is present only over the optical insulation layer.

13. The concentration sensor structure according to claim 11, wherein the functionalisation layer is homogeneous.

14. The concentration sensor structure according to claim 11, wherein the functionalisation layer has a thickness smaller than or equal to 20 nm.

15. The concentration sensor structure according to claim 1, wherein the mechanical resonator is configured to vibrate in a radial mode.

16. The concentration sensor structure according to claim 1, wherein the mechanical resonator or the optical resonator hang(s) by a foot connecting a face of the resonator(s) opposite the support and the support.

17. The concentration sensor structure according to claim 1, including means for exciting the mechanical resonator so as to make it vibrate.

18. The concentration sensor structure according to claim 1, including several sets of coupled optical and mechanical resonators or several optomechanical resonators, coupled to a unique waveguide.

19. A sensor for sensing the concentration of at least one given species in a liquid medium including at least one sensor structure according to claim 1, a light source connected to one end of the waveguide, and means for processing the light wave connected to the other end of the waveguide.

20. A microfluidic system including at least one channel for the circulation of a liquid whose concentration in at least one species is to be measured and at least one concentration sensor according to claim 19, the optical resonator and the mechanical resonator being disposed in the channel.

* * * * *